US008044671B2

(12) United States Patent
Dreyer et al.

(10) Patent No.: US 8,044,671 B2

(45) Date of Patent: Oct. 25, 2011

(54) METHOD FOR SERVICING AN APPARATUS FOR CAPACITIVE ASCERTAINING AND/OR MONITORING OF A PROCESS VARIABLE

(75) Inventors: Volker Dreyer, Lörrach (DE); Armin Wernet, Rheinfelden (DE); Roland Dieterle, Lörrach (DE)

(73) Assignee: Endress + Hauser GmbH + Co. KG, Maulburg (DE)

(*) Notice: Subject to any disclaimer, the term of this patent is extended or adjusted under 35 U.S.C. 154(b) by 0 days.

(21) Appl. No.: 12/010,011

(22) Filed: Jan. 18, 2008

(65) Prior Publication Data

US 2008/0297177 A1 Dec. 4, 2008

(30) Foreign Application Priority Data

Jan. 19, 2007 (DE) ......................... 10 2007 003 887

(51) Int. Cl.
*G01R 27/26* (2006.01)

(52) U.S. Cl. ......................... 324/690; 324/658; 324/663

(58) Field of Classification Search .................. 324/690
See application file for complete search history.

(56) References Cited

U.S. PATENT DOCUMENTS

| | | | | |
|---|---|---|---|---|
| 4,806,847 | A * | 2/1989 | Atherton et al. | 73/304 C |
| 4,831,325 | A * | 5/1989 | Watson, Jr. | 324/678 |
| 5,396,803 | A * | 3/1995 | Ferran | 73/724 |
| 6,345,537 | B1 * | 2/2002 | Salamitou | 73/861.04 |
| 6,365,888 | B2 * | 4/2002 | Von Basse et al. | 250/208.1 |
| 6,476,620 | B2 * | 11/2002 | Kato et al. | 324/662 |
| 7,288,945 | B2 * | 10/2007 | Martinez et al. | 324/663 |
| 2007/0032967 | A1 * | 2/2007 | Feen et al. | 702/47 |

* cited by examiner

*Primary Examiner* — Thomas Valone

(74) *Attorney, Agent, or Firm* — Bacon & Thomas, PLLC

(57) ABSTRACT

A method for servicing, especially checking, an apparatus for capacitive ascertaining and/or monitoring at least one process variable of a medium, wherein the apparatus has at least one probe unit with a probe electrode and an auxiliary electrode. The probe electrode and/or the auxiliary electrode are/is supplied at least with one test signal or connected with at least one electrical potential, that at least one response signal is tapped from the probe unit, and that, at least from the response signal and a predeterminable desired value, information is obtained concerning the apparatus.

5 Claims, 7 Drawing Sheets

3
8
7
6
8
Cmess
Cguard = 0

3
8
7
6
8
Cmess
Cguard = const

METHOD FOR SERVICING AN APPARATUS FOR CAPACITIVE ASCERTAINING AND/OR MONITORING OF A PROCESS VARIABLE

FIELD OF THE INVENTION

The invention relates to a method for servicing, especially for checking, an apparatus for capacitive ascertaining and/or monitoring of at least one process variable of a medium, wherein the apparatus includes at least one probe unit having a probe electrode and an auxiliary electrode. The process variable is, for example, the fill level of the medium, which is, for example, a liquid or a bulk good. "Checking" refers, for example, to reviewing or testing a measuring device with reference to the reliability of the measurements or the condition of the measuring device as such.

BACKGROUND DISCUSSION

In process and automation technology, it is known to ascertain or monitor the fill level of a medium by means of the capacitive measuring method. In such method, a probe unit and the wall of the container, or the probe unit and a second probe unit, form, together with the medium as dielectric, a capacitor. The capacitance of this capacitor is measured, and, on the basis of the measured value, fill level is ascertained. Problematic with this method is that the probe unit comes in contact with the medium and that, therefore, accretions can build on the probe unit. Such accretion leads to degradation of the measurement or even prevents measurement. In the state of the art, it is known to supply the probe unit with a relatively high measuring frequency (e.g. greater than 1 MHz), in order to improve accretion tolerance. Disadvantageous in the case of a high measuring frequency is that such is associated with a decrease in the maximum allowable probe length. This is because frequency-dependent resonance effects arise on the probe, which prevent linear measurement.

In the case of accretion formation between container wall and probe unit, a further possibility is to use so-called guard electrodes, which lie at the same electrical potential as the probe electrode and surround the probe electrode (see e.g. DE 32 12 434 C2). Depending on the character of the accretion, it is, however, possible that there will be difficulties with suitable production of the guard signal (DE 10 2004 050 495 A1).

In this case, the probe unit is thus composed of a probe electrode and an auxiliary electrode, with the probe electrode serving for the actual measurement and the auxiliary electrode serving as guard.

In the modern measurements technology, it is evermore required that prospective self tests of a measuring device be performed. In this way, for example, early warnings are possible, before the measuring device fails or before the measurement results could become unreliable.

SUMMARY OF THE INVENTION

An object of the invention is to provide a method for monitoring a capacitive measuring device, respectively the functional reliability of the measuring device.

The object is achieved according to the invention by supplying the probe electrode and/or the auxiliary electrode with at least one test signal or connecting the probe electrode and/or the auxiliary electrode with at least one electrical potential, tapping at least one response signal from the probe unit, and obtaining, at least from the response signal and a predeterminable desired value, information concerning the apparatus.

An embodiment provides that the auxiliary electrode, in the case of at least one supplying of the probe electrode with a test signal, is supplied with a signal of equal phase to the test signal or with a signal shifted in phase by 180° relative to the test signal, wherein the signal with which the auxiliary electrode is supplied has essentially the same frequency and same amplitude as the test signal.

An embodiment provides that the probe electrode is supplied with a first test signal, the auxiliary electrode is connected with ground or kept floating, a first response signal is tapped, the probe electrode is supplied with a second test signal, the auxiliary electrode is supplied with the second test signal, a second response signal is tapped, and the first response signal and the second response signal are evaluated. In this test phase, thus, two respond signals are obtained, in one case with an auxiliary, or guard, electrode connected to ground and in another case with the auxiliary, or guard, electrode at the same potential as the probe electrode. The supplying with the test signals, or the connecting with the potentials, for the respective producing of response signals is done preferably simultaneously, i.e. for a response signal, the two electrodes are supplied simultaneously or connected with potentials simultaneously. In an embodiment, the first test signal and the second test signal are identical. If the auxiliary electrode is at ground, while the probe electrode is supplied with the test signal, then there results between auxiliary electrode and probe electrode a capacitance whose value is independent of the medium, since here the insulation between auxiliary electrode and probe electrode is the dielectric. In the case wherein auxiliary electrode and probe electrode are supplied with the same test signal, there is no potential difference between the two electrodes, so the capacitance between the two electrodes is equal to zero. The test signal is preferably an electrical, alternating voltage signal, such as is used also for the capacitive measurement of fill level as a process variable. In an embodiment, the test signal is an exciting signal, with which the probe unit is supplied for the capacitive measuring of fill level. Allowing the auxiliary electrode to float means that no electrical potential is applied to it or that there is a high impedance connection relative to a reference potential.

An embodiment provides that the auxiliary electrode is supplied with a first test signal, that the probe electrode is connected with ground or allowed to float, that a first response signal is tapped, that the probe electrode is supplied with a second test signal, that the auxiliary electrode is supplied with the second test signal, that a second response signal is tapped and that the first response signal and the second response signal are evaluated. In this embodiment, thus, in a first measurement, the auxiliary electrode is supplied with the test signal and the first response signal is also preferably tapped from the auxiliary electrode.

An embodiment provides that the first response signal and the second response signal are evaluated as to whether they differ from one another by an offset. This offset results from the capacitance which forms between the auxiliary electrode and the probe electrode in the case in which the auxiliary electrode lies at ground. In an embodiment, thus, from the response signals preferably tapped from the probe electronic, the capacitance values belonging to the two measurements are ascertained and the difference is then equal to the offset.

An embodiment provides that the time behavior of the offset between the first response signal and the second response signal is evaluated. If the offset changes, thus if the value of the capacitance between auxiliary electrode and probe electrode changes, then this means that also a change has occurred at the probe unit. For this purpose, for example a limit value is defined, the exceeding of which by the offset means that reliable measurement is no longer assured, i.e. the user is, for example, correspondingly informed.

An embodiment provides that the offset between the first response signal and the second response signal is compared with a known offset value. In this embodiment, the measured value of the offset is compared with a known value for the offset, for example a value e.g. appropriately stored in the measuring device. In case of a deviation, such can, for example, be displayed by the measuring device or used for predictive maintenance.

An embodiment provides that the known offset value is ascertained during manufacture or installation of the apparatus.

In the invention, thus, quasi, the auxiliary, or guard, electrode is embodied such that it can be connected or disconnected, in order that, by way of it, information can be obtained concerning the condition of the probe and state of the environment. In one measurement, the guard is active, in that it is supplied with the same signal as the probe electrode. In the second measurement, the guard is inactive, in that it is kept floating, or the guard is connected to ground. Corresponding holds in the case of the measurement in which the probe electrode lies at ground or is kept floating. Lying between these two measurements in normal operation, i.e. when everything is in order, is a constant capacitive offset. This can be ascertained during manufacture and stored. If, now, in normal operation, there is a regular switching between the two conditions, i.e. the two response signals are obtained, with at least the second response signal resulting also in the case of a normal fill level measurement, and the ascertained offset differs from the stored value, then this can have, for example, the following causes: The probe unit is completely torn off or the electrical contacting of the probe unit, the probe electrode or the auxiliary/guard electrode is degraded, or the operating signal, i.e. at least the test signal or the contacting with ground or the floating is bad, or an accretion on the probe unit is so low resistance, that the guard function can not be performed by the auxiliary electrode. In the measuring device, corresponding means are provided for performing the method, e.g. switches connections, signal generators, etc., which can also be used for normal operation.

BRIEF DESCRIPTION OF THE DRAWINGS

The invention will now be explained in greater detail on the basis of the appended drawing, the figures of which show as follows.

DETAILED DISCUSSION

Figure 1:
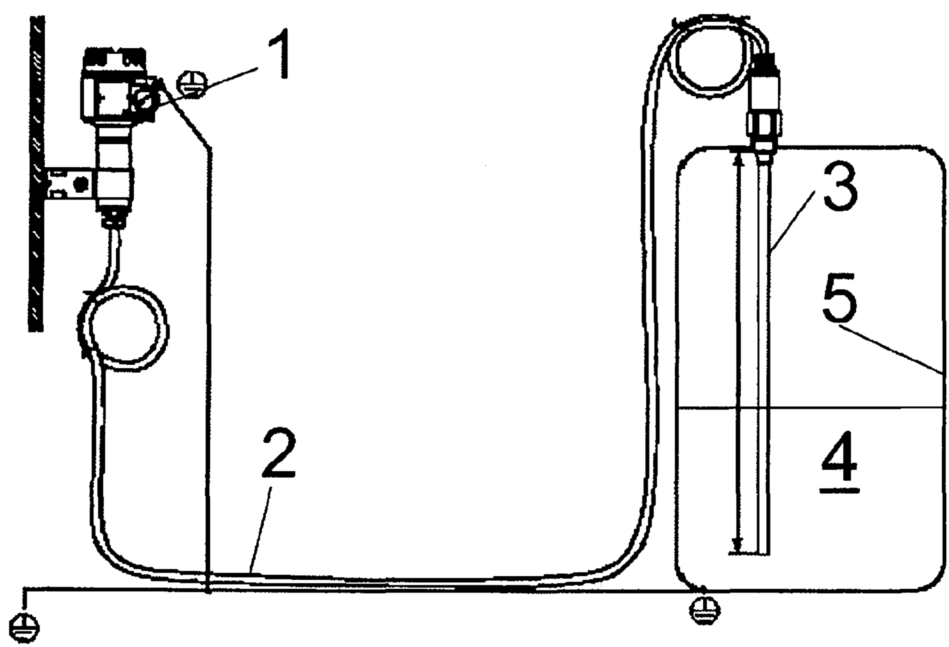
FIG. 1 a schematic representation of a capacitive fill-level measurement.

FIG. 1 shows the construction, in principle, of a capacitive measurement of the fill level of a medium 4 (for example, a liquid or a bulk good) in a container 5. For this, an electronics unit 1 is provided, which supplies, via a cable 2 to the probe unit 3, the operating signal or the test signal for the monitoring, or connects the probe unit 3 with the suitable potentials, or allows the probe unit 3 to float. Preferably involved is, in each case, an electrical, alternating voltage. The electronics unit 1 also controls the contacting with ground or the floating for the monitoring.

The probe unit 3 and the wall of the container 5 form, in combination with the medium 4 as dielectric, a capacitor. In embodiments, in which the wall of the container is not electrically conductive, preferably a second probe unit is provided. If a measurement signal is tapped from the probe unit 3 by the electronics unit 1, the capacitance of the capacitor formed by the probe unit 3, the container 5 and the medium 4 can be ascertained therefrom. The capacitance depends on the fill level of the medium 4 in the container 5. Consequently, ascertaining or monitoring capacitance permits ascertaining or monitoring of fill level.

Figure 2:
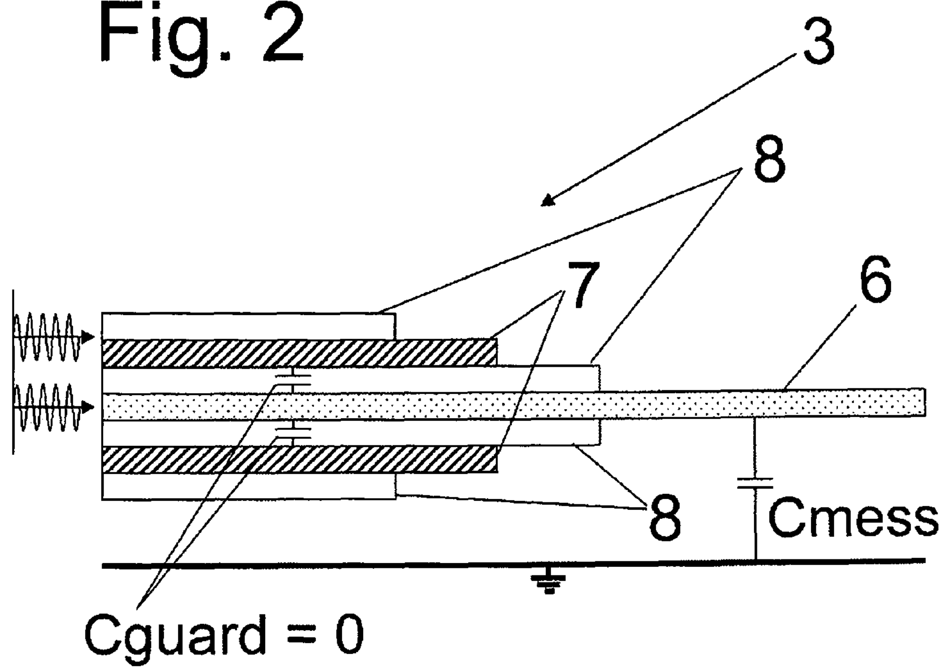
FIG. 2 a schematic section through a probe unit having a first variant of signal supply.

FIG. 2 shows, in section, the construction, in principle, of a probe unit 3. Arranged coaxially around the probe electrode 6 is an auxiliary electrode 7. Insulation 8 is located between the auxiliary electrode 7 and the probe electrode 6. Exactly the same kind of insulation 8 is located on the exterior of the auxiliary electrode 7. In the illustrated case, auxiliary electrode 7 is only partially insulated. In other embodiments, auxiliary electrode 7 is completely bare, in one case, and completely insulated, in another.

In the case illustrated here, the same alternating voltage signal is applied to both the auxiliary electrode 7 and the probe electrode 6. Since the auxiliary electrode 7 and the probe electrode 6 therefore lie at the same electrical potential, there is, ideally, no capacitance between the two electrodes 6, 7, i.e. the illustrated situation is that wherein Cguard=0.

Consequently, auxiliary electrode 7, which, here, can also be referred to as the guard electrode, provides no additional capacitive effect, so that the measurement capacitance Cmeas can be measured directly between probe electrode 6 and the container wall, respectively the second electrode. Therewith, also the ascertaining or monitoring of fill level is possible. Equal signals on the probe electrode 6—there, the signal is thus the exciting signal—and on the auxiliary electrode 7 provides, thus, an additional capacitance Cguard=0 and the capacitance value Cmeas ascertainable from the measurement signal tapped from the probe electrode 6 enables ascertaining or monitoring of the fill level of the medium.

Figure 3:
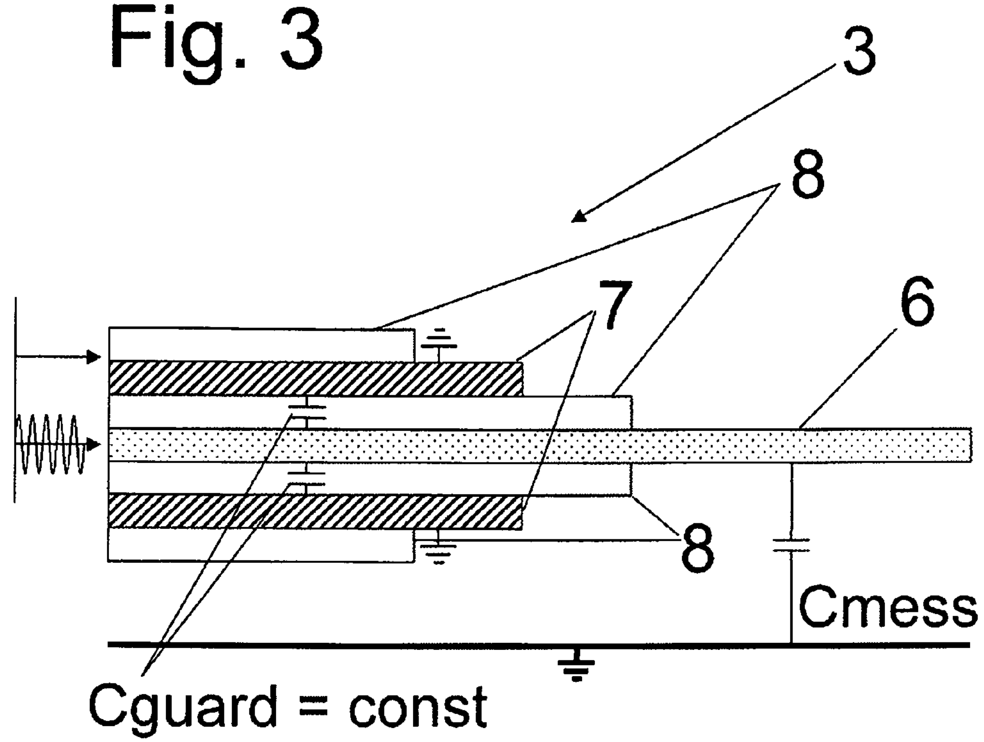
FIG. 3 a section through a probe unit having a second variant of signal supply.

FIG. 3 shows another case of supply to the electrodes 6, 7, wherein the structure of the probe unit 3 does not differ, in principle, from that shown in FIG. 2. In the case illustrated in FIG. 3, the probe electrode 6 is supplied with an alternating voltage signal as test signal, with the auxiliary electrode 7 lying at ground. From the resulting potential difference between the probe electrode 6 and the auxiliary electrode 7, an additional capacitance Cguard is formed, whose capacitance value is constant, i.e. in the illustrated case, Cguard=const. In this case, the guard of the probe unit, namely the auxiliary electrode 7, is, so to say, inactive, and the measured capacitance is composed of the actual capacitance Cmeas, which is a function of the medium, and the constant capacitance Cguard between probe electrode 6 and auxiliary electrode 7.

A monitoring of this offset, as a result of the capacitance Cguard, enables the provision of information concerning the condition of the probe unit 3, respectively of the signal path between the probe unit 3 and the electronics unit 1. I.e., if the value of Cguard, as the offset, changes, this means that also a change has occurs at the measuring device; respectively, from a tendency of the value of Cguard, predictive maintenance can be practiced.

In such case, in principle, the following cases can be distinguished:

1. The exciting signal is applied to the probe electrode 6 as test signal and the auxiliary electrode 7 is allowed to float, i.e. it is not supplied with a potential. This permits normal measuring of the fill level, in the case of which the auxiliary electrode 7 plays, quasi, no role.

2. The exciting signal is supplied to the probe electrode 6 as test signal and the auxiliary electrode 7 is connected with ground (shown in FIG. 3). In this case, a capacitance value results, which is a function of the medium and an offset. This offset can for example be calibrated during manufacturing or at startup. It should, especially, be constant, so that a change is attributable to a deterioration of the probe unit.

3. The exciting signal is supplied to the probe electrode 6 as the test signal and the auxiliary electrode 7 is supplied with a guard signal, i.e. amplitude- and phase-equal, alternating voltage signals are supplied to the two electrodes 6, 7 (shown in FIG. 2). In this case, assuming an operationally reliable probe unit 3, only the capacitance dependent on the medium results.

4. The probe electrode 6 is allowed to float and the exciting signal is supplied to the auxiliary electrode 7 as test signal. In this case, the auxiliary electrode 7 thus functions as measuring probe and, from the measurement signal correspondingly tapped from the auxiliary electrode 7, the fill level of the medium is ascertained as in the case of a normal measurement. This case corresponds, thus, to the above case 1.

5. The probe electrode 6 is connected with ground, with the exciting signal being supplied to the auxiliary electrode 7 as test signal.

Thus for the monitoring of the probe unit 3, two test measurements are performed. The respectively ascertained capacitance values differ by the offset, which results from the capacitance Cguard between auxiliary electrode and probe electrode. This value for Cguard should be constant, so that its change can be evaluated as a sign of an effect on the probe unit.

Figure 4:
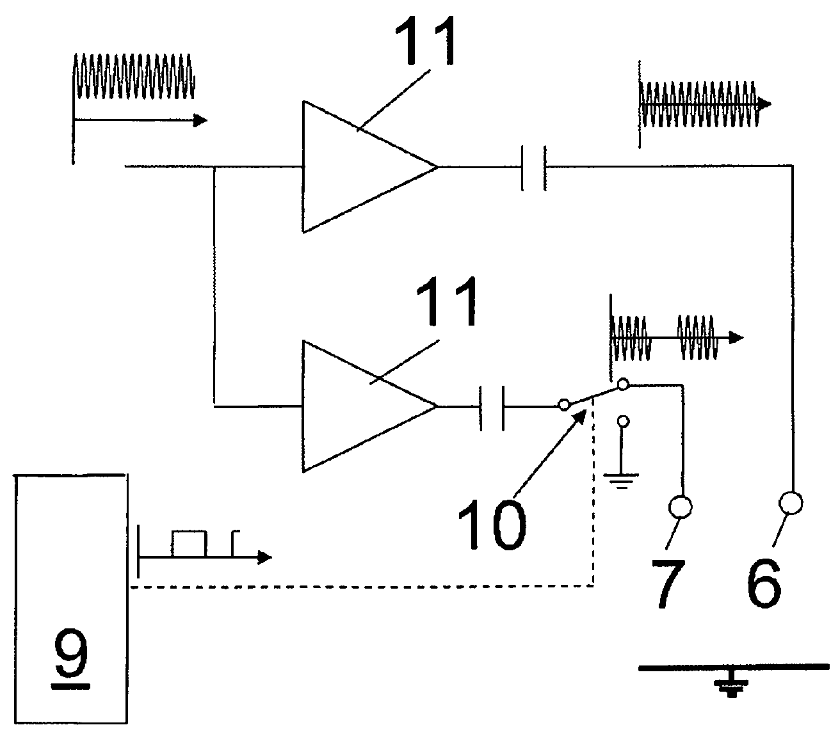
FIG. 4 a schematic presentation, in principle, of the generating of the signals for the supplying.

FIG. 4 shows a circuit, in principle, thus an equivalent circuit. Microprocessor 9 controls a switch 10 with a rectangular signal and clocks, in this way, the signal supplied to the auxiliary electrode 7. The probe electrode 6 is supplied with an operating signal via an amplifier 11. Reference is, in each case, ground, with ground being given either by the additional electrode or by the wall of the container. In each case, a capacitor downstream from the amplifier 11 filters the direct current portion from the signals.

Figure 5:
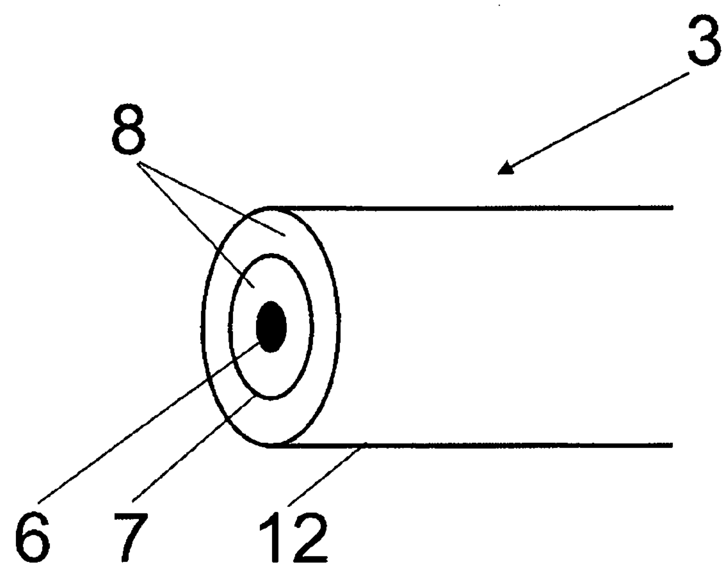
FIG. 5 a schematic presentation of an end region of a probe unit.

FIG. 5 shows a further embodiment of the probe unit 3, wherein a grounded electrode 12 coaxially surrounds the auxiliary electrode 7 and the probe electrode 6. In the case of this embodiment, a proximity switch is involved, with especially the electrodes 6, 7, 12 ending areally. This embodiment enables, thus, a flush, and, among other things, also piggable placement of the measuring device into the process or on the container wall. The probe unit 3 is essentially tubularly formed, with the end of the probe unit 3 facing the process or medium, thereby enabling access to both the probe electrode 6 and also the auxiliary electrode 7. Between probe electrode 6 and the auxiliary electrode 7 and between the auxiliary electrode 7 and the ground electrode 12 is insulation 8.

Figure 6:
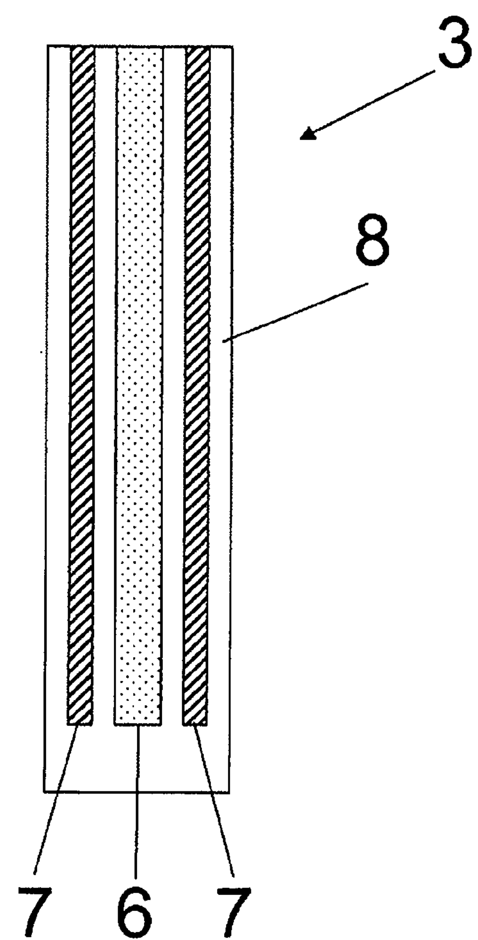
FIG. 6 a section through a schematic probe unit.

FIG. 6 shows a rod-shaped probe unit 3. An alternative thereto is a cable-shaped embodiment. Shown in this sectional view is that the probe electrode 6 is surrounded coaxially up to its end by the auxiliary electrode 7. This embodiment is, moreover, rotationally symmetric, so that the auxiliary electrode is tubularly embodied. Between the probe electrode 6 and the auxiliary electrode 7, respectively completely around the auxiliary electrode 7 is, also here, insulation 8. The insulation 8 also fulfills the goal, in the case of aggressive media, that the probe unit 3 is thus protected against damage. The insulation also prevents, however, a direct electrical connection between the probe unit 3 and the wall of the container 5 or between the probe unit 3 and the second electrode. The auxiliary electrode 7 is here completely insulated.

Figure 7:
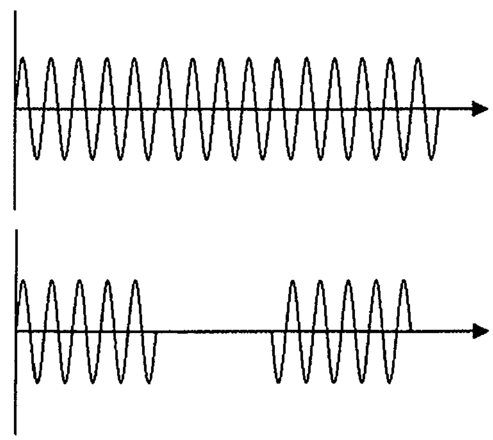
FIG. 7 curves for test signals with which the probe unit is supplied.

FIG. 7 shows the different signals supplied, for example, in one embodiment, to the probe electrode 6, respectively the auxiliary electrode 7, as test signals. Probe electrode 6 is provided with the normal sinusoidal signal in the top graph, while the auxiliary electrode 7 receives, in the case illustrated here, first a phase-equal, electrical, alternating voltage signal, then ground potential, and then an electrical, alternating voltage signal phase-shifted by 180°. This is, thus, an embodiment, where, at least in the case of one measurement, one test signal is supplied to the probe electrode 6 and another test signal is given to the auxiliary electrode. In such case, then, also a response signal is tapped from the probe electrode 6. This response signal is subsequently evaluated in combination with a second response signal as regards the condition of the measuring device.

The invention claimed is:

1. A method for servicing, especially for checking, an apparatus for capacitive ascertaining or monitoring of the fill level of a medium in a container, wherein the apparatus includes at least one probe unit comprising a probe electrode serving for actual measurement, an auxiliary electrode and an insulation that is located between said probe electrode and said auxiliary electrode, wherein said auxiliary electrode surrounds the probe electrode and serves as a guard during measurement by being supplied with the same signal as the probe electrode, the method comprising the steps of:

supplying the probe electrode with a test signal, and connecting the auxiliary electrode with ground tapping a first response signal;

disconnecting the auxiliary electrode from ground;

supplying the probe electrode with a second test signal;

supplying the auxiliary electrode with the second test signal or with a signal phase-shifted by 180° with respect to the test signal, wherein the signal supplied to the auxiliary electrode has essentially the same frequency and the same amplitude as the second test signal;

tapping a second response signal;

evaluating the first response signal and the second response signal as to whether they differ from one another by an offset; and obtaining information concerning a deterioration of the probe unit at least from said offset and predetermined, desired value.

2. The method as claimed in claim 1, further comprising the step of:

evaluating the time behavior of the offset between the first response signal and the second response signal.

3. The method as claimed in claim 1, further comprising the step of:

comparing the offset between the first response signal and the second response signal with a known offset value.

4. The method as claimed in claim 3, further comprising the step of:

ascertaining the known offset value during manufacture or during installation of the apparatus.

5. A Method for servicing, especially for checking, an apparatus for capacitive ascertaining or monitoring of the fill level of a medium in a container, wherein the apparatus includes at least one probe unit comprising a probe electrode serving for actual measurement, an auxiliary electrode and an insulation that is located between said probe electrode and said auxiliary electrode, wherein said auxiliary electrode surrounds the probe electrode and serves as a guard during measurement by being supplied with the same signal as the probe electrode, the method comprising the steps of:

supplying the auxiliary electrode with a test signal and connecting the probe electrode with ground;

tapping a first response signal;

disconnecting the probe electrode from ground;

supplying the probe electrode with a second test signal;

supplying the auxiliary electrode with the second test signal or with a signal phase-shifted by 180° with respect to the test signal, wherein the signal supplied to the auxiliary electrode has essentially the same frequency and the same amplitude as the second test signal;

tapping a second response signal;

evaluating the first response signal and the second response signal as to whether they differ from one another by an offset; and obtaining information concerning a deterioration of the probe unit at least from said offset and a predetermined desired value.

* * * * *